(12) United States Patent
Persson et al.

(10) Patent No.: US 9,276,683 B2
(45) Date of Patent: Mar. 1, 2016

(54) LOAD ESTIMATION IN WIRELESS COMMUNICATION

(75) Inventors: Anders Persson, Kode (SE); Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 394 days.

(21) Appl. No.: 13/394,183

(22) PCT Filed: Sep. 8, 2009

(86) PCT No.: PCT/SE2009/051003
§ 371 (c)(1),
(2), (4) Date: Mar. 5, 2012

(87) PCT Pub. No.: WO2011/031193
PCT Pub. Date: Mar. 17, 2011

(65) Prior Publication Data
US 2012/0163420 A1    Jun. 28, 2012

(51) Int. Cl.
*H04B 3/46*        (2015.01)
*H04B 17/00*       (2015.01)
*H04Q 1/20*        (2006.01)
*H04B 17/309*      (2015.01)
*H04B 17/327*      (2015.01)
(Continued)

(52) U.S. Cl.
CPC ............ *H04B 17/309* (2015.01); *H04B 17/327* (2015.01); *H04B 17/336* (2015.01); *H04B 17/345* (2015.01)

(58) Field of Classification Search
None
See application file for complete search history.

(56) References Cited

U.S. PATENT DOCUMENTS

| 2003/0003921 A1* | 1/2003 | Laakso ........................ 455/453 |
| 2003/0086398 A1* | 5/2003 | Hiltunen ...................... 370/335 |

(Continued)

FOREIGN PATENT DOCUMENTS

| WO | 2004/025986 A2 | 3/2004 |
| WO | 2006076969 A1  | 7/2006 |

(Continued)

OTHER PUBLICATIONS

Wigern, T. "Soft Uplink Load Estimation in WCDMA." IEEE Transactions on Vehicular Technology, vol. 58, No. 2, Feb. 2009.

(Continued)

*Primary Examiner* — Shuwang Liu
*Assistant Examiner* — Gina McKie
(74) *Attorney, Agent, or Firm* — Murphy, Bilak & Homiller, PLLC (57) ABSTRACT

A method for noise rise estimation in a wireless communication system comprises measuring of received total wideband power a plurality of times and computing an estimate of a noise floor measure based on a number of the measured received total wideband powers. An interference whitening is performed based on one of GRAKE, GRAKE–and chip equalizer. A useful signal power for the first user after interference whitening is determined. A first user noise floor compensation factor is derived based on combining weights for the first user used in the interference whitening. A code power to interference ratio measure for said first user is obtained. A noise rise measure is calculated, based at least on the useful signal power for the first user after interference whitening, the first user noise floor compensation factor, the code power to interference ratio measure for the first user and the noise floor measure.

11 Claims, 6 Drawing Sheets

(51) Int. Cl.
*H04B 17/336* (2015.01)
*H04B 17/345* (2015.01)

(56) References Cited

U.S. PATENT DOCUMENTS

| | | | |
|---|---|---|---|
| 2007/0054619 A1 | 3/2007 | Kinnunen et al. | |
| 2009/0176455 A1* | 7/2009 | Wigren et al. | 455/67.13 |
| 2012/0082195 A1* | 4/2012 | Wigren | 375/220 |
| 2012/0140657 A1* | 6/2012 | Wigren | 370/252 |
| 2012/0163420 A1* | 6/2012 | Persson et al. | 375/144 |
| 2012/0243594 A1* | 9/2012 | Wigren | 375/227 |
| 2013/0039184 A1* | 2/2013 | Wigren | 370/235 |
| 2013/0308480 A1* | 11/2013 | Wigren et al. | 370/252 |

FOREIGN PATENT DOCUMENTS

| | | |
|---|---|---|
| WO | 2007024166 A1 | 3/2007 |
| WO | 2008039123 A1 | 4/2008 |
| WO | 2008097145 A1 | 8/2008 |
| WO | 2008143562 A1 | 11/2008 |
| WO | 2009072961 A2 | 6/2009 |

OTHER PUBLICATIONS

3GPP, "3rd Generation Partnership Project; Technical Specification Group Radio Access Network; Requirements for support of radio resource management (FDD) (Release 6)", 3GPP TS 25.133 V6.10.0, Jun. 2005, 1-157.

Bottomley, G et al., "On the Equivalence of Chip Equalization and Generalized RAKE Reception.", Ericsson Internal Technical Report, EUS/G42-02:0140/REP, Revision B, Jan. 6, 2004, 1-15.

Fulghum, Tracy L. et al., "Adaptive Generalized Rake Reception in DS-CDMA Systems", IEEE Transactions on Wireless Communications, vol. 8, No. 7, Jul. 2009, 1-11.

Wigren, Torbjorn et al., "Estimation of uplink WCDMA load in a single RBS", IEEE 66th Vehicular Technology Conference 2007, IEEE Conference Publications, Baltimore, MD, USA., Sep.30-Oct. 3, 2007, 1-5.

Wigren, Torbjörn, "Load Estimation with Uplink Interference Cancellation", Ericsson Internal Technical Report, Mar. 24, 2009, 1-15.

* cited by examiner

LOAD ESTIMATION IN WIRELESS COMMUNICATION

TECHNICAL FIELD

The present invention relates in general to methods and devices for estimation of power-related quantities in cellular communications systems and in particular to such methods and devices in cellular communications systems using interference whitening.

BACKGROUND

Wideband Code Division Multiple Access (WCDMA) telecommunication systems have many attractive properties that can be used for future development of telecommunication services. In particular, the enhanced uplink of the WCDMA system is one ingredient in the mobile broadband solution of WCDMA. Now, in order to retain stability of a WCDMA cell, possibly a cell running enhanced uplink, the load needs to be kept below a certain level. This follows since the majority of uplink user channels, at least in WCDMA, are subject to power control. This power control aims at keeping the received power level of each channel at a certain signal to interference ratio (SIR), in order to be able to meet specific service requirements.

Since the Radio Base Station (RBS) tries to keep each channel at its specific preferred SIR value, it may happen that an additional user, or bursty data traffic of an existing user, raises the interference level, thereby momentarily reducing the SIR for the other users. The response of the RBS is to command a power increase to all other users, something that increases the interference even more. Normally this process remains stable below a certain load level. In case a high capacity channel would suddenly appear, the raise in the interference becomes large and the risk for instability, a so called power rush, increases. It is thus a necessity to schedule high capacity uplink channels, like the enhanced uplink (EUL) channel in WCDMA, so that one can insure that instability is avoided. In order to do so, the momentary load must be estimated in the RBS or any node connected thereto. This enables the assessment of the capacity margin that is left to the instability point.

One approach to improve load estimation is disclosed in the published international patent application WO 2006/076969. A minimum value of a power quantity, preferably a difference between the instantaneous total received wideband power and the instantaneous sum of powers of all links used in the same cell, is used as an estimate of an upper limit of the thermal noise floor, based on which a noise rise measure can be estimated. An optimal and soft algorithm for noise rise estimation based on a similar basic idea of minimum values is disclosed in the published international patent application WO 2007/024166.

To handle increasing uplink data rates, interference cancellation (IC) is being introduced in WCDMA. A conventional procedure to perform IC is summarized by the following steps. A channel model of the interferer to be cancelled is estimated. This does not cause any additional operations, since this channel model is anyway needed. The transmitted signal of the interferer to be cancelled is also decoded. This is also anyway needed. A replica of the received signal of the interferer to be cancelled is then created, by use of the channel model and the decoded signal. This replica may e.g. be reconstructed as an IQ chip stream. The replica of the interfering signal is subsequently subtracted from the received signal of the user to be decoded, thereby hopefully reducing the remaining power of the interferer to very low power levels.

This procedure obviously affects the load measurement functionality of the WCDMA EUL. Thus, the scheduler must be aware of the instantaneous uplink load in several signal points of the new IC receiver structure in order to be able to utilize the entire amount of resources. Unless such load estimates are made available it will not be possible to exploit the link gains fully, when scheduling EUL users. In the published international patent application WO 2008/097145, load estimation with IC of this conventional type is handled in analogy with earlier noise rise estimation procedures.

Another approach to limit the effect of interference is to use some kind of interference whitening approaches, such as GRAKE, GRAKE+ or chip equalizer. In GRAKE+, a covariance matrix $\hat{R}_u$, u=1, ..., U, with an order equal to the number of fingers is first estimated to capture the interference. The codes not used by the present user u may be used in order to estimate the covariance matrix $\hat{R}_u$. The GRAKE+ receiver thus uses an estimated covariance matrix $\hat{R}_u$ that models the interference for computation of the combining weights for the users u, u=1, ..., U. Expressed mathematically, it can be written:

$$\hat{R}_u \hat{w}_u = \hat{h}_u, u=1, \ldots, U, \quad (1)$$

where $\hat{h}_u$, u=1, ..., U, is the net channel response of user u and where $\hat{w}_u$ are the combining weights. The effect of (1) is that GRAKE+ essentially whitens the correlated interference and removes large spectral peaks from interferers at certain finger locations and for certain antenna elements. Thus, in GRAKE+, the user experiences a reduced level of interference, immediately after the weight combining step. Note that GRAKE+ is still a linear receiver.

In order to utilize the reduced interference provided by the GRAKE+ receiver, the load estimations have to be performed taking the interference whitening of the GRAKE+ into account. However, in contrary to what is valid for interference cancellation based on regeneration and subtraction, the thermal noise floor is changed in the same manner as the interference reduction obtained by the GRAKE+ process, and can no longer be treated as constant after interference whitening. A treatment analogue of WO 2008/097145 can therefore not be used for achieving a noise rise estimation, the reason being that WO 2008/097145 requires the noise floor to be constant. There is thus a problem of using the created reduced interference, since no reliable noise rise estimation is available. Similar problems are present for systems utilizing GRAKE, where sub-blocks of the covariance matrix of (1) are used.

There is a related type of interference whitening receiver for WCDMA which is also linear, denoted the chip equalizer. The difference between GRAKE+ and the chip equalizer is simply the order of certain basic operations. The consequence is that the problems of providing a reliable noise rise measure are valid for the systems using the chip equalizer as well.

SUMMARY

An object of the present invention is thus to provide methods and arrangements for providing reliable noise rise estimations in wireless communication systems using interference whitening methods, such as the GRAKE+ or the chip equalizer receivers. A further object is to provide such methods and arrangements, in which the requested computational power is relatively limited.

The object is achieved by methods and arrangements according to the enclosed independent patent claims. Preferred embodiments are defined by the dependent claims. In general, in a first aspect, a method for noise rise estimation in a wireless communication system comprises measuring of received total wideband power a plurality of times and computing an estimate of a noise floor measure based on at least a number of the measured received total wideband powers. An interference whitening is performed based on one of GRAKE, GRAKE+ and chip equalizer for a first user. A useful signal power for the first user after interference whitening is determined. A first user noise floor compensation factor is derived based on combining weights for the first user used in the interference whitening. A code power to interference ratio measure for said first user is obtained. A noise rise measure for said first user is calculated, based at least on the useful signal power for the first user after interference whitening, the first user noise floor compensation factor, the code power to interference ratio measure for the first user and the noise floor measure.

In a second aspect, an arrangement for noise rise estimation in a wireless communication system comprises a digital receiver and an interference whitener connected to the digital receiver. The interference whitener is based on one of GRAKE, GRAKE+ and chip equalizer. The interference whitener is arranged for providing interference whitening for a plurality of users at an output. The arrangement further comprises a processor connected to the digital receiver and to the output from the interference whitener. The processor is arranged for measuring received total wideband power received at the digital receiver a plurality of times and further arranged for computing an estimate of a noise floor measure based on at least a number of the measured received total wideband powers. The processor is further arranged for determining a useful signal power for a first user of the plurality of users after interference whitening. The processor is further arranged for deriving a first user noise floor compensation factor based on combining weights for the first user used in the interference whitening. The processor is further arranged for obtaining a code power to interference ratio measure for the first user. The processor is also further arranged for calculating a noise rise measure for the first user, based at least on the useful signal power for the first user after interference whitening, the first user noise floor compensation factor, the code power to interference ratio measure for the first user and the noise floor measure.

In a third aspect, a base station of a wireless communication system comprises an arrangement for noise rise estimation according to the second aspect.

One advantage with the present invention is that the reduced interference levels achieved by GRAKE+ or chip equalizer can be fully utilized to increase the total available capacity of a wireless communication system. This can be performed even with a relatively limited available computational power.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the entire disclosure, bold letters in equations refer to vector or matrix quantities.

In the drawings, corresponding reference numbers are used for similar or corresponding parts.

Figure 1:
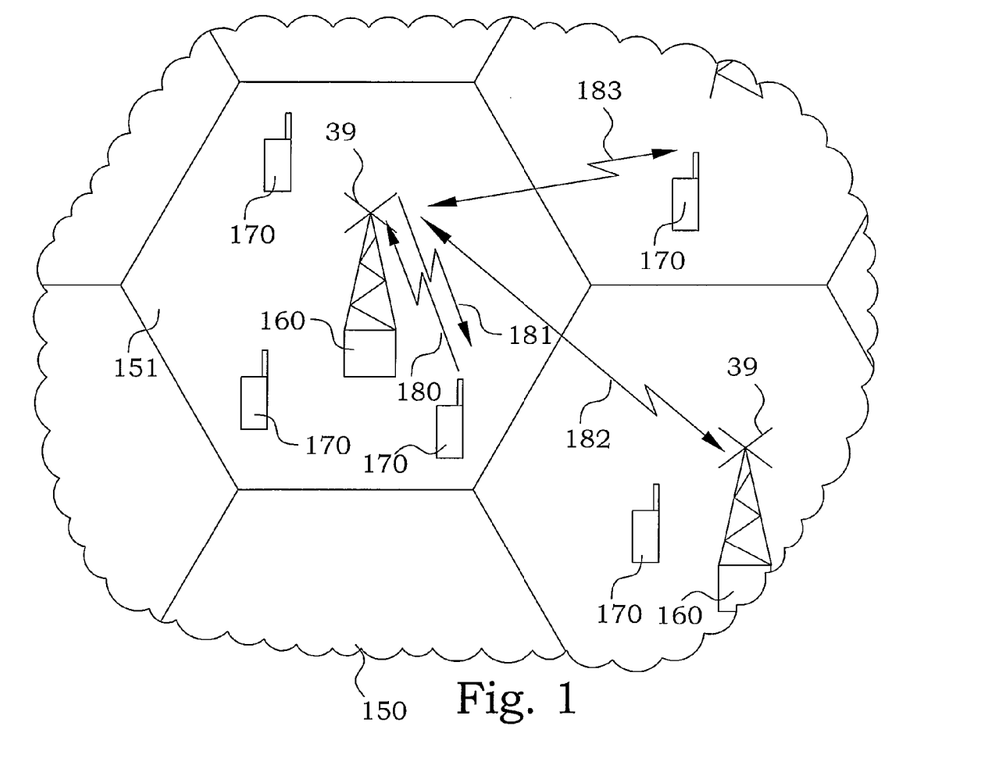
FIG. 1 is a schematic illustration of a wireless communication system.

The present invention relates to arrangements and methods in wireless communication systems. FIG. 1 illustrates a schematic view of an embodiment of such a wireless communication system 150. A radio base station 160 communicates via its antenna/antennas 39 with a multitude of user equipments (UE) 170 situated within a cell 151 of the wireless communication system 150. Radio signals transmitted from the RBS 160 to the UEs 170 are denoted as downlink signals 181, and radio signals transmitted from the UEs 170 to the RBS 160 are denoted as uplink signals 180. This invention mainly considers the uplink signals, whereby arrangements for noise rise estimation typically are provided in the RBS 160. Besides the intentional uplink signals 180, the RBS 160 also receives interfering signals 183.

In order to understand the solved problems and advantages with the present invention, a short summary of prior art load estimation principles are presented as a background. Without IC, the load at an antenna connector is given by the noise rise, or rise over thermal (RoT), RoT(t), defined by:

$$RoT(t) = \frac{RTWP(t)}{N(t)}, \qquad (2)$$

where N(t) is the thermal noise level as measured at the antenna connector. It remains to define what is meant with RTWP(t). The definition used here is simply the total wideband power:

$$RTWP(t) = \sum_{k=1}^{K} P_k(t) + I^N(t) + N(t), \qquad (3)$$

also measured at the antenna connector. Here $I^N(t)$ denotes the power as received from neighbour cells ($^N$) of the communication system. As will be seen below, the major difficulty of any RoT estimation algorithm is to separate the thermal noise power from the interference from neighbour cells.

Another specific problem that needs to be addressed when determining the load is that the signal reference points are, by definition, at the antenna connector. The measurements are however obtained after the analogue signal conditioning chain, in the digital receiver. The analogue signal conditioning chain does introduce a scale factor error of about 1 dB (1-sigma) that is difficult to compensate for. Fortunately, all powers of (3) are equally affected by the scale factor error so when (2) is calculated, the scale factor error is cancelled as $$RoT^{Digital\ Receiver}(t) = \frac{RTWP^{Digital\ Receiver}(t)}{N^{Digital\ Receiver}(t)} = \frac{\gamma(t)RTWP^{Antenna}(t)}{\gamma(t)N^{Antenna}(t)} = RoT^{Antenna}(t). \quad (4)$$

In order to understand the fundamental problem of neighbour cell interference when performing load estimation, note that $$I^N(t)+N(t)=E[I^N(t)]+E[N(t)]+\Delta I^N(t)+\Delta N(t), \quad (5)$$

where E[ ] denotes mathematical expectation and where Δ denotes the variation around the mean. The fundamental problem can now be clearly seen. Since there are no measurements available in the RBS that are related to the neighbour cell interference, a linear filtering operation can at best estimate the sum $E[I^N(t)]+E[N(t)]$. This estimate cannot be used to deduce the value of E[N(t)]. The situation is the same as when the sum of two numbers is available. Then there is no way to figure out the values of the individual numbers. This issue is analysed rigorously for the RoT estimation problem in published international patent application WO 2007/024166 where it is proved that the noise power floor is not mathematically observable.

Figure 2:
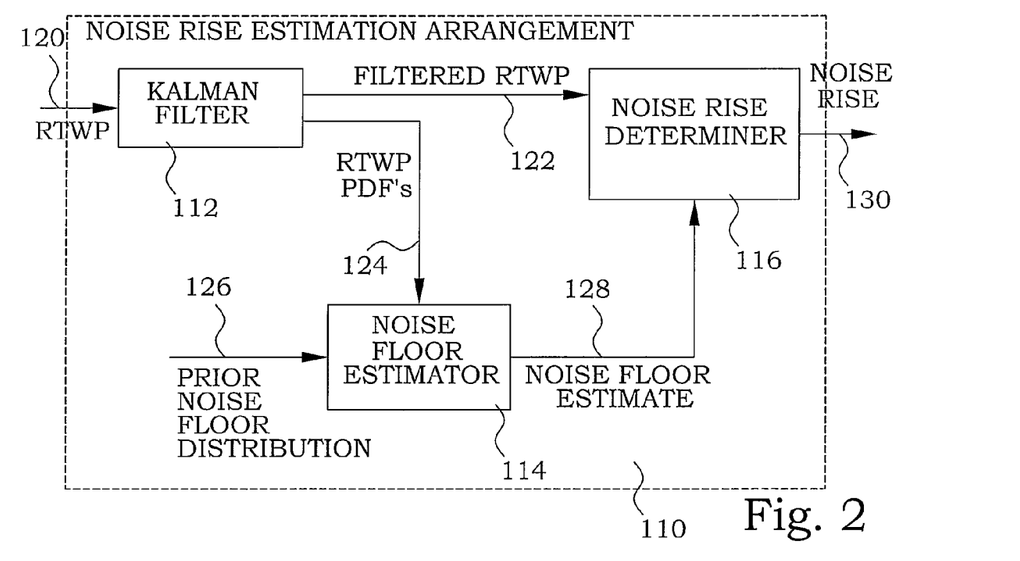
FIG. 2 is a schematic illustration of a noise rise estimation arrangement.

An embodiment of the RoT estimation algorithm currently in use is depicted in FIG. 2. It is described in detail in the published international patent application WO 2007/024166. The algorithm estimates the RoT, as given by (2). The main problem solved by the estimation algorithm is the accurate estimation of the thermal noise floor N(t). Since it is not possible to obtain exact estimates of this quantity due to the neighbour cell interference, the estimator therefore applies an approximation, by consideration of the soft minimum as computed over a relative long window in time.

In particular, an arrangement 110 for noise rise estimation in a wireless communication system is supplied with RTWP measurements 120. The RTWP measurements 120 are used in a Kalman filter 112 to produce filtered estimates 122 of the RTWP as well as probability density functions 124 of the RTWP. These probability density functions 124 are provided to a noise floor estimator 114, in which noise floor estimates 128 are provided with knowledge of a prior noise floor distribution 126. The noise floor estimator 114 operates preferably with a sliding window algorithm. The noise floor estimates 128 and the filtered estimates 122 of the RTWP are provided to a noise rise determiner 116, producing an output of a noise rise measure, in this embodiment a RoT value 130.

It is important to understand that this estimation relies on the fact that the noise floor is constant over very long periods of time (disregarding the small temperature drift).

The sliding window algorithm of the above section has the disadvantage of requiring a large amount of storage memory. This becomes particularly troublesome in case a large number of instances of the algorithm are needed, as may be the case when IC is introduced in the uplink. To reduce the memory consumption a recursive algorithm was disclosed in the published international patent application WO 2007/0055626. That algorithm reduces the memory requirements of the sliding window scheme discussed above at least by a factor of 100. The invention disclosed here is applicable both to the sliding window RoT estimation algorithm and the recursive algorithm.

Figure 3:
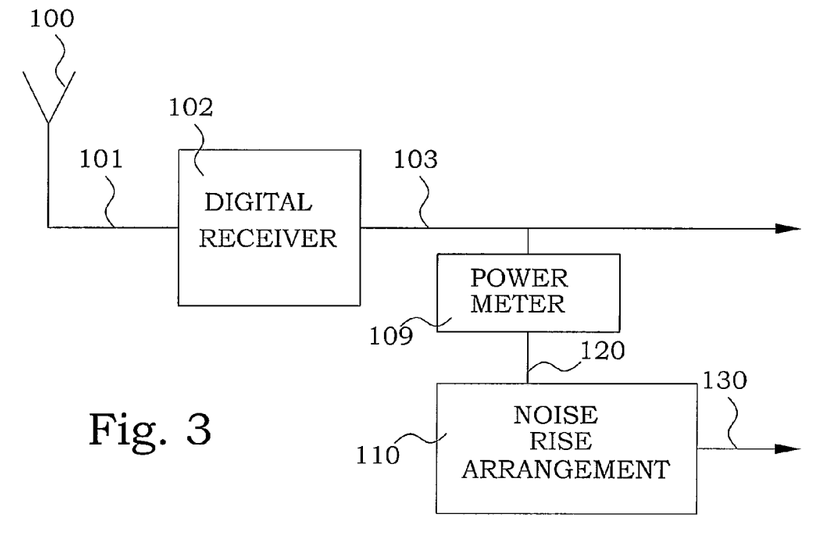
FIG. 3 is a schematic illustration of a receiver chain including a noise rise arrangement.

FIG. 3 schematically illustrates the arrangement 110 for noise rise estimation in relation to the receiver chain. An antenna 100 receives electromagnetic signals and gives rise to a received analogue signal 101, which is provided to a digital receiver 102. The digital receiver 102 provides a stream of digital signals 103 representative to the analogue signals, however, as mentioned above modified with a certain scale factor. A measurement unit 109 is connected to the stream of digital signals 103 and performs measurements of received total wideband powers 120, which are handed on to the arrangement 110 for noise rise estimation.

Figure 4:
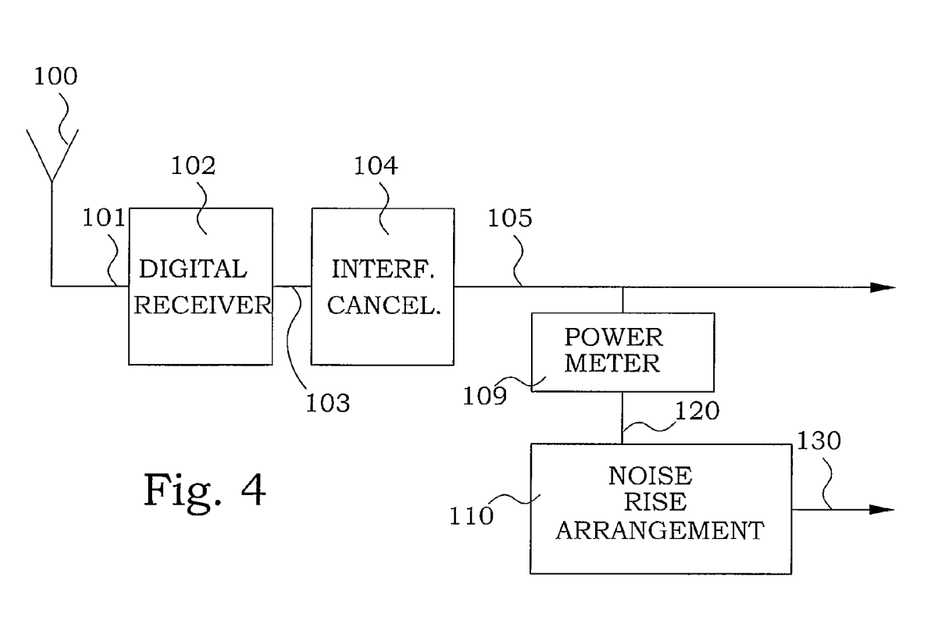
FIG. 4 is a schematic illustration of a receiver chain including interference cancellation and a noise rise arrangement.

As mentioned in the background section, different interference cancellation methods based on regeneration and subtraction are often used. This is schematically illustrated in FIG. 4. The stream of digital signals 103 is provided to an interference canceller 104, where signals not intended for a particular user are removed. An interference cancelled digital signal 105 intended for a particular user is provided as output. As also mentioned before, load estimation can be applied also to such interference cancelled digital signal 105, where the measured RTWP measure refers to the digital signal after interference cancelling. For IC with regeneration and subtraction there is no change of the scale factor for the thermal noise power floor. The consequence is that the RoT estimation algorithms are still applicable in this case, since a constant noise power level is estimated.

It is important to observe that the effect of this procedure is different for different users, since an interferer is a user on its own. The consequence for load estimation is that there is no longer a uniform way to look on the interference of the WCDMA uplink. The load instead becomes individual for each user. Hence combining user interference to a general uplink cell load is no longer trivial.

The present invention provides solutions where load estimations reflect the reduced interference experienced by users exploiting interference whitening receivers. The load of a particular single user exploiting GRAKE, GRAKE+ or the chip equalizer can be estimated. Also, the individual load estimations can be combined into a load estimation for the whole cell.

The present invention disclosure is focused on GRAKE+. However, also systems using GRAKE or chip equalizers can be configured in a similar manner.

The load estimations that reflect the reduced interference experienced by users exploiting interference whitening receivers can be obtained by estimating the received signal and exploiting results from the GRAKE process by matrix-vector operations in order to scale the noise floor estimate to the influence of the interference whitening process. Unfortunately, such operations require quite large computational power, which is why such a solution may be inappropriate for applications with limited available computational power. According to the present invention, only computation of inner products is necessary, which limits the required computational complexity significantly, possibly of the order of at least ten times.

The main scope is to develop and disclose procedures for code power estimation per user, capturing the effect of interference whitening. Furthermore, procedures for code power to interference ratio estimation per user, capturing the effect of interference whitening should also be provided. Noise floor compensation factor estimation per user considering the effect of interference whitening is also preferably provided. Also RoT estimation or other noise rise measures per user, capturing the effect of interference whitening is calculated. This calculation uses the code power estimate per user, the user code power to interference ratio estimate per user and the noise floor compensation factor per user. Preferably, load estimation (uplink) per cell, capturing the effect of interference whitening is also performed, using the code power estimates per user, the user code power to interference ratio estimate per user, the noise floor compensation factor estimation per user and the RoT estimate per user.

The present approach uses the estimation at the point where the "sufficient statistics" (the performance metric) used for decoding is available. Sufficient statistics refers to the exact knowledge of the probability distribution functions of a stochastic process, over time. A Gaussian stochastic process is e.g. completely defined by its mean value and covariance matrix, both as a function of time–no other information is needed to write down the probability distribution functions of said Gaussian stochastic process. In case of the G-rake+receiver such a sufficient statistics is available after interference whitening as discussed further below.

A mathematical back transformation technique is also applied, allowing the interference to be expressed using the signal to interference ratio that is anyway estimated in e.g. the ASIC. This reduces the ASIC estimation needs to the own user "performance metric" power, avoiding the need to estimate the interference, as seen by each user after interference whitening processing. This results in a very low computational complexity. A compensation factor computation is also performed, for scaling of the thermal noise power floor to the "sufficient statistics" signal point, said thermal noise power floor being estimated with prior art techniques. This compensation factor computation is also of low computational complexity.

Figure 5:
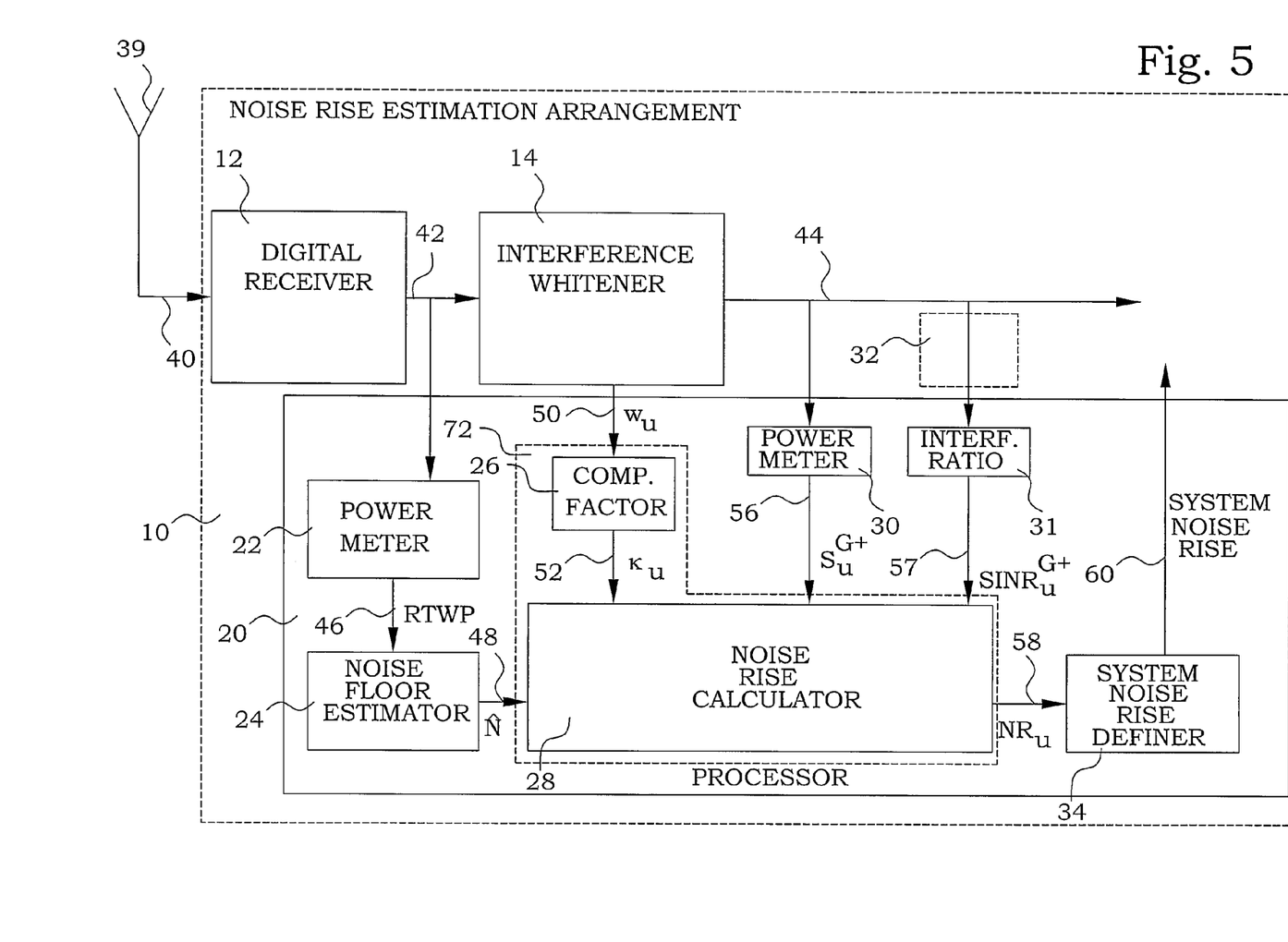
FIG. 5 is a block scheme of an embodiment of a noise rise estimation arrangement according to the present invention.

An embodiment of an arrangement 10 for noise rise estimation in a wireless communication system is schematically illustrated in FIG. 5. The arrangement 10 for noise rise estimation comprises a digital receiver 12, an interference whitener 14 and a processor 20. The interference whitener 14 is connected to the digital receiver 12 for receiving digital signals therefrom. The interference whitener 14 is generally based on one of GRAKE, GRAKE+ and the chip equalizer, and in this particular embodiment on GRAKE+. The interference whitener 14 is intended for providing interference whitening for a plurality of users at an output, providing interference whitened digital signals 44.

The processor 20 is connected to the digital receiver 12 and to the output from the interference whitener 14. The processor 20 has a power meter 22, arranged for measuring received total wideband power 46 of the signals 42 received at the digital receiver 12 a plurality of times. These measured received total wideband powers 46 are provided at an output from the power meter 22. The processor 20 has further a noise floor estimator 24 connected to the output of the power meter 22. The noise floor estimator 24 is arranged for computing an estimate of a noise floor measure $\hat{N}$ 48 based on at least a number of the measured received total wideband powers 46.

The processor 20 is further arranged for calculating a noise rise measure for individual users, taking the effect of the interference whitening into account. For this task a number of input factors are needed. During the interference whitening process, combining weights $w_u$ are obtained, see e.g. equation (1). These combining weights $w_u$ 50 are supplied to a compensation factor calculating section 26 of the processor 20. As will be described more in detail further below, a noise floor compensation factor $\kappa_u$ 52 for a user u is preferably derived as the product of a conjugate transpose of the combining weights $w_u$ 50 and the combining weights $w_u$ 50 themselves if an approximation for white noise power floor can be accepted. This is the case in the illustrated embodiment. Alternatively, if a coloured noise power floor has to be taken into account, the noise floor compensation factor $\kappa_u$ 52 for the user u is derived as the trace of the product of a conjugate transpose of the combining weights $w_u$ 50, a thermal noise covariance matrix representing the correlation due to the spectral shape of the whole wideband channel and the combining weights $w_u$ 50 themselves divided by the trace of the covariance matrix. The thermal noise covariance matrix representing the correlation due to the spectral shape of the whole wideband channel is also obtainable from the interference whitening process.

In the present embodiment, the processor also comprises a second power meter 30 that is connected to be responsive to interference whitened digital signals 44 output from the interference whitener 14. In this second power meter 30, a useful signal power $S_u^{G+}$ 56 for each user of the plurality of users is determined as defined after the interference whitening.

The processor 20 of the present embodiment also comprises an interference ratio measure obtaining section 31. This interference ratio measure obtaining section 31 is arranged for obtaining a measure of a code power to interference ratio. The code power to interference ratio measure is preferably C/I or SINR, and in the present embodiment a $SINR_u^{G+}$ measure 57 is used. As explained further below, a C/I measure can be converted into a SINR measure and vice versa. In many applications, the SINR is already calculated elsewhere in the receiver system, and in such alternative embodiments, the actual interference ratio measure is deduced in an external section, as indicated by the broken line box 32, and the interference ratio measure obtaining section 31 is then merely reduced to a means adapted to receive information about such measure.

The processor 20 further comprises a noise rise calculator 28. In this noise rise calculator 28 a noise rise measure $NR_u$ for a specific user u is calculated based at least on the useful signal power $S_u^{G+}$ 56 for the concerned user after interference whitening, the concerned user noise floor compensation factor $\kappa_u$ 52, the code power to interference ratio measure $SINR_u^{G+}$ 57 for the concerned user and the noise floor measure $\hat{N}$ 48. Consequently, the noise rise calculator 28 is thereby connected to the compensation factor calculating section 26, the second power meter 30 and the interference ratio measure obtaining section 31, and of course to the noise floor estimator 24. The compensation factor calculating section 26 is preferably integrated together with the noise rise calculator 28, forming a load estimator 72. As will be explained more in detail below, the noise rise measure $NR_u$ for a first user u is preferably calculated as the useful signal power $S_u^{G+}$ 56 for the first user after interference whitening divided by the product of the user noise floor compensation factor $\kappa_u$ 52 and the noise floor measure $\hat{N}$ 48 and multiplied with a factor depending on the inverse of the code power to interference ratio measure $SINR_u^{G+}$ 57 for the first user.

In this embodiment, the different functionalities of the processor 20 are illustrated as separate part units. However, anyone skilled in the art realises that the functionalities can be configured and realised in different manners, separately or integrated, fully or partly. The part units associated with the different functionalities should therefore only be considered as separate units concerning their functionality.

In this embodiment, the arrangement 10 for noise rise estimation is further arranged for defining a system noise rise measure. The processor 20 is thereby arranged for repeating the operations for achieving a user specific noise rise measure for a plurality of users. The processor 20 further comprises a system noise rise definer 34, connected to the noise rise calculator 28. The system noise rise definer 34 is arranged for defining a system noise rise measure 60 based on the noise rise measures 58 for the plurality of users. Details of preferred procedures to achieve the system noise rise measure 60 are presented further below.

Figure 6:
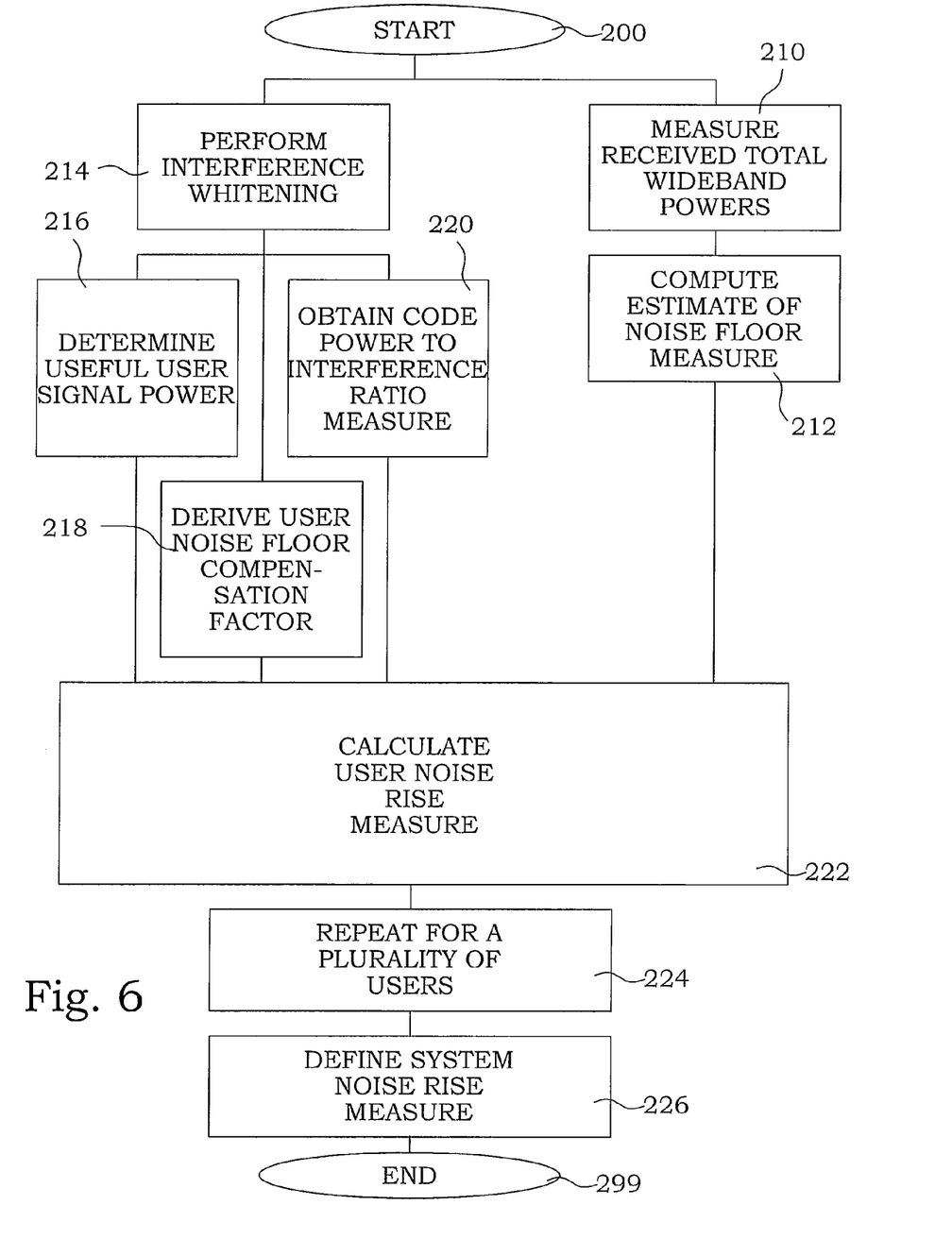
FIG. 6 is a flow diagram of an embodiment of a method according to the present invention.

In FIG. 6, a flow diagram of an embodiment of a method according to the present invention is illustrated. The method for noise rise estimation in a wireless communication system begins in step 200. In step 210, received total wideband power is measured a plurality of times. An estimate of a noise floor measure is computed in step 212 based on at least a number of the measured received total wideband powers. In step 214, an interference whitening is performed based on one of the techniques GRAKE, GRAKE+ and chip equalizer for at least a first user. Step 214 can be performed before, after or partially or entirely concurrent to the steps 210 and/or 212. In step 216, a useful signal power for at least the first user after interference whitening is determined.

In step 218, which can be performed independently of step 216, a user noise floor compensation factor for at least the first user is derived based on combining weights for the respective user used during the interference whitening. In one embodiment, the first user noise floor compensation factor is derived as the product of a conjugate transpose of the combining weights and the combining weights themselves. This is preferred as an approximation for a white noise power floor. In another embodiment, the first user noise floor compensation factor is derived as the trace of the product of a conjugate transpose of the combining weights, a thermal noise covariance matrix representing the correlation due to the spectral shape of the whole wideband channel and the combining weights divided by the trace of the covariance matrix. This is preferred as an approximation for a coloured noise power floor.

A code power to interference ratio measure for at least the first user is obtained in step 220. The code power to interference ratio measure is preferably C/I or SINR. In step 222, a noise rise measure for the first user is calculated based at least on the useful signal power for the first user after interference whitening, the first user noise floor compensation factor, the code power to interference ratio measure for the first user and the noise floor measure. Preferably, the noise rise measure for the first user is calculated as the useful signal power for the first user after interference whitening divided by the product of the user noise floor compensation factor and the noise floor measure and multiplied with a factor depending on the inverse of the code power to interference ratio measure for the first user.

In step 224, the previous user specific steps of performing 214, determining 216, deriving 218, obtaining 220 and calculating 222 are repeated for a plurality of users. A system noise rise measure is defined in step 226 based on the noise rise measures for the plurality of users. In one embodiment, the system noise rise measure is defined as a maximum noise rise measure of the noise rise measures for the plurality of users. In another embodiment, the system noise rise measure is defined as an average noise rise measure of the noise rise measures for the plurality of users. In yet another embodiment, the system noise rise measure is defined as corresponding to a pre-selected percentile of the noise rise measures for the plurality of users. The procedure ends in step 299.

A detailed embodiment based on GRAKE+ of the present invention is here below presented in more mathematical terms.

Measurement of Load After IC in GRAKE+ and Chip Equalizers

To see how load can be estimated taking account of the GRAKE+ IC gain, the powers after weight combining are studied at sufficient statistics level. First, it is assumed that the received signal of user u on code $k \in \Omega_u$ is $$y_{u,k}=h_u s_{u,k}+I_{u,k}+N_{u,k}, u=1, \ldots, U, k=1, \ldots, K \quad (6)$$

where $\Omega_u$ denotes the set of codes for user u, $s_{u,k}$, u=1, ..., U, k=1, ..., K, is the signal, $I_{u,k}$, u=1, ..., U, k=1, ..., K, is the interference and $N_{u,k}$, u=1, ..., U, k=1, ..., K, is the (thermal) noise signal (not power) and $\hat{h}_u$, u=1, ..., U, is the net channel response of user u. GRAKE+ then performs weight combining to get the sufficient statistics $z_{u,k}^{G+}$ according to the equations $$\hat{z}_{u,k}^{G+}=\hat{w}_u^H y_{u,k}=\hat{w}_u^H \hat{h}_u s_{u,k}+\hat{w}_u^H I_{u,k}+\hat{w}_u^H N_{u,k}, u=1, \ldots, U, k=1, \ldots, K. \quad (7)$$

$$\hat{R}_u \hat{w}_u = \hat{h}_u, u=1, \ldots, U \quad (8)$$

Here $\hat{w}_u$ are the combining weights of GRAKE+, whereas the estimated covariance matrix that models the interference for computation of the combining weights for the users u is given by $\hat{R}_u$. Equations (7) and (8) have two main implications; one indicating how power measurements can be done and one indicating the scale factor problem which is addressed below.

Using equation (7) it can be seen that the effect of the GRAKE+ weight combining is the same as if an artificial received signal $z_{u,k}^{G+}$ would be processed. Since these signals obviously reflect the weight combining and thereby the IC gains of the GRAKE+ receiver, $z_{u,k}^{G+}$, u=1, ..., U, k=1, ..., K, is believed to be a relevant starting point for load estimation.

As stated above, the load estimator operates by processing of the RTWP and in the future possibly the RSEPS. For this reason, similar power signals need to be formed from the $z_{u,k}^{G+}$, u=1, ..., U, k=1, ..., K, in order to reuse the load concept applied without IC.

User Powers Associated With the GRAKE+ Sufficient Statistics

Squaring (7) and assuming a low degree of correlation between its three terms, leads to:

$$|\hat{z}_{u,k}^{G+}|^2 \approx \hat{w}_u^H \hat{h}_u \hat{h}_u^H \hat{w}_u |s_{u,k}|^2 + \hat{w}_u^H I_{u,k} I_{u,k}^H \hat{w}_u + \hat{w}_u^H N_{u,k} N_{u,k}^H \hat{w}_u = S_{u,k}^{G+}+I_{u,k}^{G+}+N_{u,k}^{G+}, u=1, \ldots, U, k=1, \ldots, K. \quad (9)$$

Here, $S_{u,k}^{G+}$ is the useful code signal power for the user u after interference whitening, $I_{u,k}^{G+}$ is the code interference signal power for the user u after interference whitening and $N_{u,k}^{G+}$ is the code noise floor power for the user u after interference whitening.

The rise over thermal (2), as seen by user u is now, by definition $$RoT_u^{G+} \equiv \frac{S_u^{G+}+I_u^{G+}+N_u^{G+}}{N_u^{G+}} \quad (10)$$

$$S_u^{G+} = \sum_{k \in \Omega_u} S_{u,k}^{G+} \quad (11)$$

$$I_u^{G+} = \sum_k I_{u,k}^{G+} \quad (12)$$

$$N_u^{G+} = \sum_k N_{u,k}^{G+}. \quad (13)$$

Note that it is unclear how to distinguish between $S_{u,k}^{G+}$, $I_{u,k}^{G+}$ and $N_{u,k}^{G+}$ for $k \in \Omega_u$. The algorithm disclosed here avoids many of these problems, since both $I_{u,k}^{G+}$ and $N_{u,k}^{G+}$ are computed from other quantities. Note further that in (9) $S_{u,k}^{G+}=\hat{w}_u^H \hat{h}_u \hat{h}_u^H \hat{w}_u |s_{u,k}|^2$, i.e. the power is expressed starting with the (transmitted) code power $|s_{u,k}|^2$. The same quantity $S_{u,k}^{G+}$ can also be expressed starting with the antenna power $|e_{u,k}|^2=\hat{h}_u^H \hat{h}_u |s_{u,k}|^2$, in which case $S_{u,k}^{G+}=\hat{w}_u^H \hat{w}_u |$ $|e_{u,k}|^2$. This latter setting is used in the link simulations used for validation of the concept. The algorithmic development that follows does however use the definitions (9)-(13).

Computation of the Useful Signal Power

The signal power is computed directly from (11). Using (9) and (11) then results in:

$$S_u^{G+} = \sum_{k \in \Omega_u} S_{u,k}^{G+} = \hat{w}_u^H \hat{h}_u \hat{h}_u^H \hat{w}_u \sum_{k \in \Omega_u} |S_{u,k}|^2 = \hat{w}_u^H \hat{h}_u \hat{h}_u^H \hat{w}_u \hat{E}_{s,u} = |\hat{w}_u^H \hat{h}_u|^2 \hat{E}_{s,u}, \quad (14)$$

$$u = 1, \ldots, U.$$

Note that computation of the signal energy $\hat{E}_{s,u}$ is quite intricate, including e.g. the involved beta factors.

Computation of the Noise Floor Power

White Noise Power Floor

The idea here is to rely on the thermal noise power floor estimation algorithm used in prior art methods, to estimate the thermal noise power floor before any GRAKE+ processing. A main problem then arises since the thermal noise is scaled by $\hat{w}_u$ when the sufficient statistics is evaluated. This means that the thermal noise power level will no longer appear constant.

The approach taken here to circumvent this problem builds on the calculation of the compensation factor by which the thermal noise power is scaled. To compute this quantity, first note that when the wideband thermal noise power floor is estimated before GRAKE+ processing, the following quantity is estimated $$\hat{N} = \frac{1}{M} \sum_{m=1}^{M} \sum_{k=1}^{K} (N_{u,k}^m)^H N_{u,k}^m \underset{M \to \infty}{\to} KE[(N_{u,k})^H N_{u,k}] = \quad (15)$$

$$KP_{N_{u,k}} = K\frac{1}{K}P_N = N_0,$$

where $N_0$ is the thermal noise power floor. The power at the sufficient statistics signal processing point is however:

(16)

$$\hat{N}^{G+} = \frac{1}{M} \sum_{m=1}^{M} \sum_{k=1}^{K} (\hat{w}_u^H N_{u,k}^m)^H \hat{w}_u^H N_{u,k}^m = \frac{1}{M} \sum_{m=1}^{M} \sum_{k=1}^{K} tr((\hat{w}_u^H N_{u,k}^m)^H \hat{w}_u^H N_{u,k}^m)$$

$$= \frac{1}{M} \sum_{m=1}^{M} \sum_{k=1}^{K} tr(\hat{w}_u^H N_{u,k}^m (\hat{w}_u^H N_{u,k}^m)^H) = \frac{1}{M} \sum_{m=1}^{M} \sum_{k=1}^{K} tr(\hat{w}_u^H N_{u,k}^m (N_{u,k}^m)^H \hat{w}_u)$$

$$= tr\left(\sum_{k=1}^{K} \hat{w}_u^H \left(\frac{1}{M} \sum_{m=1}^{M} N_{u,k}^m (N_{u,k}^m)^H\right) \hat{w}_u\right) \underset{M \to \infty}{\to}$$

$$tr(K\hat{w}_u^H E[N_{u,k}(N_{u,k})^H]\hat{w}_u)$$

$$= tr(K\hat{w}_u^H (N_0/K)I\hat{w}_u) = \hat{w}_u^H \hat{w}_u N_0 = \hat{w}_u^H \hat{w}_u \hat{N}.$$

The conclusion is that the thermal noise floor at the sufficient statistics signal point can be obtained from the noise floor estimate before GRAKE+ processing, by a multiplication with the compensation factor:

$$\kappa_u^{G+} = (\hat{w}_u)^H \hat{w}_u, \quad u=1, \ldots, U. \quad (17)$$

This gives:

$$N_u^{G+} = \kappa_u^{G+} \hat{N}, \quad u=1, \ldots, U. \quad (18)$$

The computation of the compensation factor only requires an additional inner product for each user.

Coloured Noise Power Floor

This subsection discusses the case where the result of (15) is replaced by the more general assumption:

$$\frac{1}{M} \sum_{m=1}^{M} \sum_{k=1}^{K} N_{u,k}^m (N_{u,k}^m)^H \underset{M \to \infty}{\to} KE[N_{u,k}(N_{u,k})^H] = K\frac{N_0}{K} R_N = N_0 R_N, \quad (19)$$

i.e. the case when sampling is fast enough to reflect the shape of the uplink spectrum. In this case it follows that (15) is transformed to:

$$\hat{N} = \frac{1}{M} \sum_{m=1}^{M} \sum_{k=1}^{K} (N_{u,k}^m)^H N_{u,k}^m \underset{M \to \infty}{\to} KE[(N_{u,k})^H N_{u,k}] = \quad (20)$$

$$Ktr(E[N_{u,k}(N_{u,k})^H]) = N_0 tr(R_N).$$

Furthermore, (16) is transformed into $$\hat{N}^{G+} = N_0 tr(\hat{w}_u^H R_N \hat{w}_u). \quad (21)$$

The end result in this case is the compensation factor:

$$\kappa_u^{G+} = \frac{tr(\hat{w}_u^H R_N \hat{w}_u)}{tr(R_N)}. \quad (22)$$

Computation of Interference Signal Power Using Available SINRs

In the possible implementing ASIC, the code power to interference ratio is:

$$(C/I)_u^{G+} = \frac{S_u^{G+}}{I_u^{G+} + N_u^{G+}}, u = 1, \ldots, U. \quad (23)$$

It can be noted that in (23), all quantities except $I_u^{G+}$ have already been computed, see (16) and (18). Using these quantities, (23) can be solved for $I_u^{G+}$, giving:

$$I_u^{G+} = \frac{S_u^{G+}}{(C/I)_u^{G+}} - \kappa_u^{G+} \hat{N}, u = 1, \ldots, U. \quad (24)$$

In the ASIC, the $(C/I)_u^{G+}$ quantity is typically not directly available. It can however be directly related to SINR which is estimated in the ASIC. This is performed as:

$$(C/I)_u^{G+} = \frac{(\beta_{u,EDPCCH}^2 + \beta_{u,DPDCH}^2 + n_{u,codes}\beta_{u,EDPDCH}^2)}{\beta_{u,EDPCCH}^2 SF_{u,EDPCCH}} SINR_u^{G+} = \quad (25)$$

$$\frac{\beta_{u,effective}^2}{SF_{u,EDPCCH}} SINR_u^{G+}$$

which gives:

$$I_u^{G+} = \frac{S_u^{G+}}{(C/I)_u^{G+}} - \kappa_u^{G+} \hat{N} = \frac{SF_{u,EDPCCH}}{\beta_{u,effective}^2} \frac{S_u^{G+}}{SINR_u^{G+}} - \kappa_u^{G+} \hat{N}. \quad (26)$$

SINR is defined as (25). It is understood by anyone skilled in the art that also other code power to interference ratio measures can be used to calculate C/I and/or SINR in order to provide a similar quantity.

Computation of Rise Over Thermal

When (14), (18) and (26) are inserted in (10), the end result becomes:

$$RoT_u^{G+} \equiv \frac{S_u^{G+} + I_u^{G+} + \kappa_u^{G+}\hat{N}}{\kappa_u^{G+}\hat{N}} = \frac{S_u^{G+}}{\kappa_u^{G+}\hat{N}}\left(1 + \frac{SF_{u,EDPCCH}}{\beta_{u,effective}^2}\frac{1}{SINR_u^{G+}}\right), \quad (27)$$

$$u = 1, \ldots, U.$$

These measures, for each user, are then combined into an uplink measure as outlined below.

Note that (27) provides some interesting insights. When SINR is high, then the RoT for the user is essentially determined by the remaining own power of the user—the RoT then increases when the SINR gets worse.

Computation of RTWP and RSEPS Equivalents

The computation of the equivalent of RTWP and RSEPS power, at the sufficient statistics signal point, is discussed next. It follows from (27) that the equivalent of RTWP, seen by user u, becomes $$S_{u,RTWP}^{G+} = S_u^{G+}\left(1 + \frac{SF_{u,EDPCCH}}{\beta_{u,effective}^2}\frac{1}{SINR_u^{G+}}\right), \quad (28)$$

$$u = 1, \ldots, U.$$

The equivalent of RSEPS, as seen by user u, is therefore obtained by a summation over the RSEPS user codes, when still using $\hat{h}_u$ and $\hat{w}_u$:

$$S_{u,RSEPS}^{G+} = \sum_{u_{RSEPS}=1}^{U_{RSEPS}} S_{u(u_{RSEPS})}^{G+}, \quad u = 1, \ldots, U \quad (29)$$

$$S_{u(u_{RSEPS})}^{G+} = \sum_{k\in\Omega_{u(u_{RSEPS})}} S_{u,k}^{G+} = \hat{w}_u^H \hat{h}_u \hat{h}_u^H \hat{w}_u \sum_{k\in\Omega_{u(u_{RSEPS})}} |s_{u,k}|^2 \quad (30)$$

$$= \hat{w}_u^H \hat{h}_u \hat{h}_u^H \hat{w}_u \hat{E}_{s,u(u_{RSPES})} = |\hat{w}_u^H \hat{h}_u|^2 \hat{E}_{s,u(u_{RSEPS})},$$

$$u_{RSEPS} = 1, \ldots, U_{RSEPS}.$$

Note again that the channel model of user u is retained when summing over the codes of the RSEPS users. Hence the computation needs to be performed once for each user.

Uplink Load Measures for GRAKE+

Averaged Load Measure

Averaging over all users using (27), gives the uplink load measure:

$$\langle RoT^{G+}\rangle = \frac{1}{U}\sum_{u=1}^{U} RoT_u^{G+}. \quad (31)$$

This measure may not be suitable since it does not capture the effect of users with poor IC gain, these users being more likely to cause instability by power increases. Similarly, the averaged RTWP and RSEPS measures become:

$$\langle S_{RTWP}^{G+}\rangle = \frac{1}{U}\sum_{u=1}^{U} S_{u,RTWP}^{G+} \quad (32)$$

$$\langle S_{RSEPS}^{G+}\rangle = \frac{1}{U}\sum_{u=1}^{U} S_{u,RSEPS}^{G+}. \quad (33)$$

Worst Case Load Measure

Rather than performing averaging a worst case approach may therefore be taken, where the averaging is replaced by a maximum operation. This means that the user that sees the maximum total load is used for load estimation purposes. This conservative approach could hence be motivated by cell stability arguments—however it may also be too conservative. The worst case load is defined by the equations:

$$u_{max} = \operatorname*{argmax}_{u}(RoT_u^{G+}) \quad (34)$$

$$\max(RoT_u^{G+}) = RoT_{u_{max}}^{G+} \quad (35)$$

$$\max(S_{RTWP}^{G+}) = S_{u_{max},RTWP}^{G+} \quad (36)$$

$$\max(S_{RSEPS}^{G+}) = S_{u_{max},RSEPS}^{G+} \quad (37)$$

Outage Interference Measure

A third alternative would be to sort the $RoT_u^{G+}$ and then select the user corresponding to a selected percentile.

Today, it is common practice to implement the computationally most intense parts of the WCDMA uplink radio receivers on application specific integrated circuits (ASICs). Typically, such ASICs provides RAKE, GRAKE or GRAKE+ receiver processing for a multitude of users, using dedicated parallel hardware. It is e.g. previously known to implement channel estimation, weight combining, demodulation and decoding on such ASICS, for multiple users. To achieve this, the ASICS may be equipped with dedicated accelerators e.g. for TURBO decoding, matrix operations and similar. This is facilitated by the fact that ASICS can be programmed to perform different tasks, exploiting a variety of such hardware accelerator resources. To our knowledge, prior to the present invention, dedicated processing means for load estimation has however not been implemented on ASICS.

In a preferred embodiment of an arrangement for noise rise estimation in a wireless communication system, at least a part of the functionality of the processor as illustrated in FIG. 5 is implemented by at least one of an Application Specific Integrated Circuit (ASIC) and a Digital Signal Processor (DSP). The embodiment presents ASIC implementation of at least a subset of the above described functionality.

Figure 7:
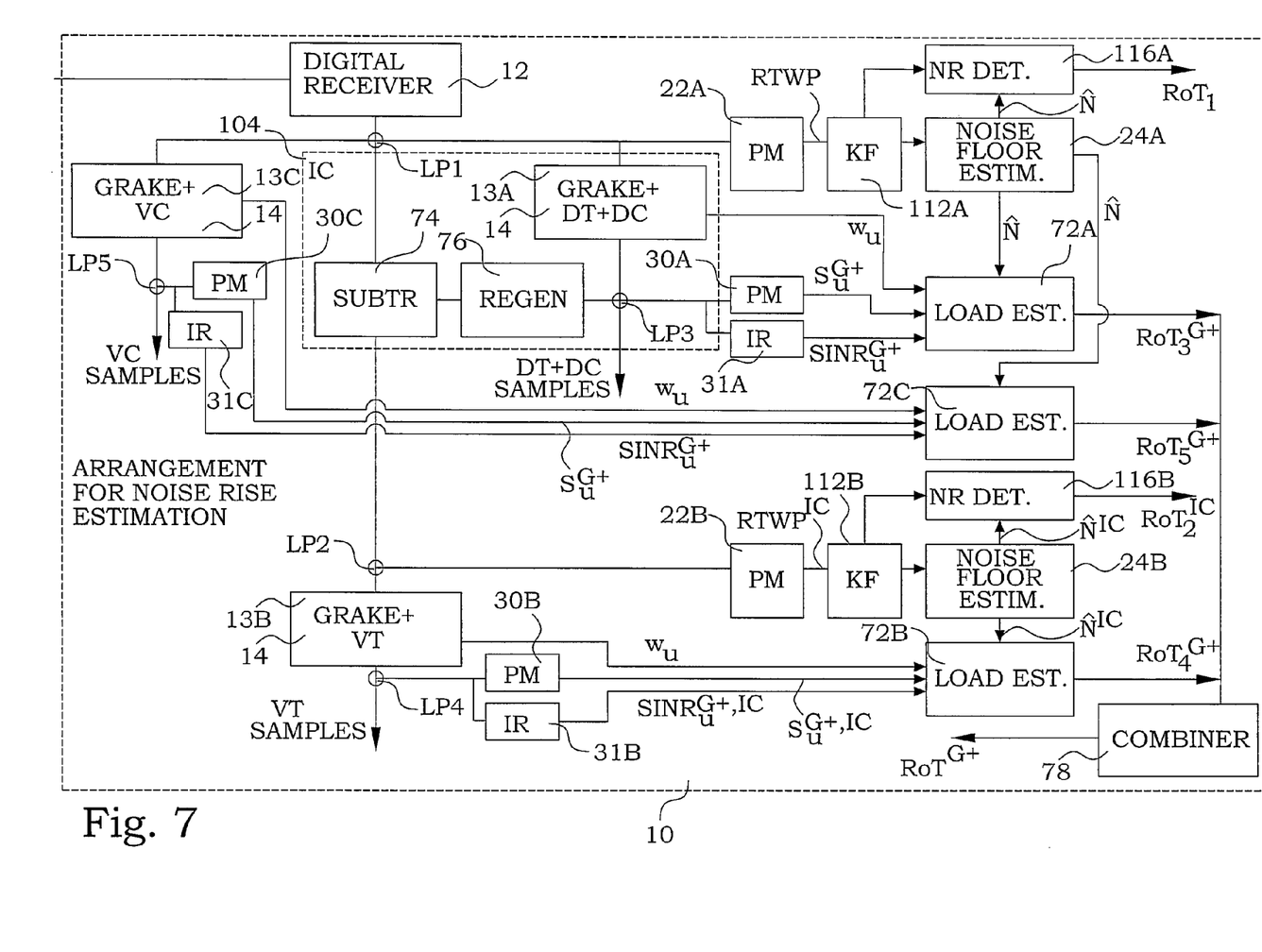
FIG. 7 is a schematic illustration of another embodiment of a noise rise estimation arrangement according to the present invention.

FIG. 7 depicts a load estimator structure in a typical embodiment reflecting a tentative uplink receiver structure. This embodiment is relatively easily implemented by an ASIC or a DSP. This particular embodiment combines subtraction IC and GRAKE+.

A digital receiver 12 provides chip samples to a first load point LP1. The chip samples are provided to three interference whiteners 14, in this embodiment GRAKE+ unit 13A, GRAKE+ unit 13B and GRAKE+ unit 13C. GRAKE+ unit 13A is configured to consider only data traffic signals and data control signals, GRAKE+ unit 13B is configured to consider only voice traffic signals and GRAKE+ unit 13C is configured to consider only voice control signals. The data traffic signals and data control signals from interference whitened by GRAKE+ unit 13A are used for regenerating a version of the original signals connected to data traffic in a data traffic regenerator 76. This regenerated signal is then subtracted from the original chip sample in the subtractor 74. The difference signal available at a second load point LP2 is thereby mainly comprises contributions from voice traffic signals. The GRAKE+ unit 13A, the data traffic regenerator 76 and the subtractor 74 together form an interference canceller 104 based on interference whitening, regeneration and subtraction.

Load measures or in particular noise rise measures such as rise over thermal (RoT) can be obtained from different positions in the system. The load in the first load point LP1 and in the second load point LP2 can be obtained by a load estimation according to prior art ideas. To this end, a power meter 22A measures the received total wideband power RTWP at LP1. The measured RTWP is provided to a Kalman filter 112A, which outputs probability density functions of the RTWP to a noise floor estimator 24A, which in turn provides a noise floor estimate $\hat{N}$. The Kalman filter 112A furthermore provides a filtered RTWP measure to a noise rise determiner 116A, which by assistance of the noise floor estimate $\hat{N}$ determines a first noise rise measure $RoT_1$ associated with the first load point LP1.

Similarly, the signals at the second load point LP2, i.e. the signals that are subjected to interference cancellation of the interference canceller 104, can also be used in an analogous manner. A power meter 22B, a Kalman filter 112B, noise floor estimator 24B and a noise rise determiner 116B are in connected in an analogous manner to provide a second noise rise measure associated with the second load point LP2. Note that the load estimate at LP1 is valid for the uplink, while the estimate at LP2 is individual for each user.

However, the arrangement has also access to several GRAKE+ units, which allows the system to utilize suppression of interference by means of interference whitening. The most appropriate load measure for scheduling purposes would therefore be a combined measure of the loads for the individual GRAKE+ units. This can be performed according to the ideas in the present disclosure. A third, fourth and fifth load point LP3-LP5 are located directly after a respective weight combining. At the third load point LP3 after the GRAKE unit 13A, signals connected to data traffic and data control remains whereas signals connected to voice traffic and voice control are suppressed by considering them as interference, as are data traffic and control signals of other users than the one being processed. A power meter 30A measures useful signal power $S_u^{G+}$ per user and provides this measure to a load estimator 72A. Similarly, an interference ratio measure obtaining section 31A obtains a measure of a code power to interference ratio $SINR_u^{G+}$ and provides this measure to the load estimator 72A. The GRAKE unit 13A also provides the combining weights $w_u$ obtained during the interference whitening. The load estimator 72A comprises in this embodiment a compensation factor calculating section and a noise rise calculator in analogy with FIG. 5. A third noise rise measure $RoT_3^{G+}$ associated with the third load point LP3 after GRAKE+ interference whitening is estimated based on the useful signal power, the user noise floor compensation factor, the code power to interference ratio measure and the noise floor estimate $\hat{N}$ as achieved from the noise floor estimator 24A.

Similarly, at the fourth load point LP4 after the GRAKE unit 13B, signals connected to voice traffic remains whereas signals of other users are suppressed by considering them as interference. A power meter 30B measures useful signal power $S_u^{G+,IC}$ per user associated with the interference cancelled signals and provides these measures to a load estimator 72B. Similarly, an interference ratio measure obtaining section 31B obtains a measure of a code power to interference ratio $SINR_u^{G+,IC}$ and provides this measure to the load estimator 72B. The GRAKE unit 13B also provides the combining weights $w_u$ obtained during the interference whitening. The load estimator 72B comprises in this embodiment a compensation factor calculating section and a noise rise calculator in analogy with FIG. 5. A fourth noise rise measure $RoT_4^{G+}$ associated with the fourth load point LP4 after GRAKE+ interference whitening of the interference cancelled signal is estimated based on the useful signal power, the user noise floor compensation factor, the code power to interference ratio measure and the noise floor estimate $\hat{N}$ as achieved from the noise floor estimator 24B.

Finally, at the fifth load point LP5 after the GRAKE unit 13C, signals connected to voice control remains whereas signals of other users are suppressed by considering them as interference. A power meter 30C measures useful signal power $S_u^{G+}$ per user and provides these measures to a load estimator 72C. Similarly, an interference ratio measure obtaining section 31C obtains a measure of a code power to interference ratio $SINR_u^{G+}$ and provides this measure to the load estimator 72C. The GRAKE unit 13C also provides the combining weights $w_u$ obtained during the interference whitening. The load estimator 72C comprises in this embodiment a compensation factor calculating section and a noise rise calculator in analogy with FIG. 5. A fifth noise rise measure $RoT_5^{G+}$ associated with the fifth load point LP5 after GRAKE+ interference whitening of the interference cancelled signal is estimated based on the useful signal power, the user noise floor compensation factor, the code power to interference ratio measure and the noise floor estimate $\hat{N}$ as achieved from the noise floor estimator 24A.

The load information associated with the loads immediately after weight combining of the three GRAKE units 13A-C is combined in a load combiner 78. Possibly, also the second noise rise measure $RoT_2^{IC}$ associated with the second load point LP2 can be used as input to the load combiner 78. The combination may be performed in different ways, e.g. as a direct sum, as a weighted sum or according or by an algorithm depending on the present load distribution situation.

If implementing the system of FIG. 7 by ASIC functionality, specific algorithms and interfaces are needed in the ASIC for computation and signalling. The equations (14), (18)/(22), (19) need identifications carrying information on whether the user is an RSEPS user. Furthermore, the algorithms need to be implemented for each GRAKE+ block of FIG. 7. The quantities above need to be made available for load computation at least with 10 ms rate, possibly by 2 ms rate.

Note that scale factor errors of the order of 1 dB occur between antenna branches. Unless a separate estimation of noise power floors are used, the consequence is that a too large margin may be needed in the scheduler. This follows since the dominating antenna channel (the one with the highest scale factor) would also dominate the noise floor estimation. Hence, the RoT would be underestimated for the channel with the lowest scale factor, something that opens up for reduced stability margins via the antenna branch with the lowest actual scale factor. The ASIC should hence also preferably allow for functionality that distinguishes between different analogue signal paths.

The invention discloses techniques that allow for load estimation that reflects the interference whitening gains of GRAKE+ and similar techniques, thus enhancing coverage and cell throughput at system level. Without the disclosed invention, large parts of the link gains associated with GRAKE+ would not materialize, due to the need to use too conservative margins.

Simulation

In order to assess the performance of the approach, 1500 slots (1 s) of data was created with a radio link simulation. The radio model used was the so called Pedestrian A model. Four high rate users, each using transmitting about 940 kbit/s on the enhanced uplink were simulated with the GRAKE+ receiver in the RBS. Each user then experiences the other users as interferers, and the computation of the RoT experienced after GRAKE+ processing (27) was compared to the RoT over the air interface. The result is depicted in FIGS. 8 and 9.

Figure 8:
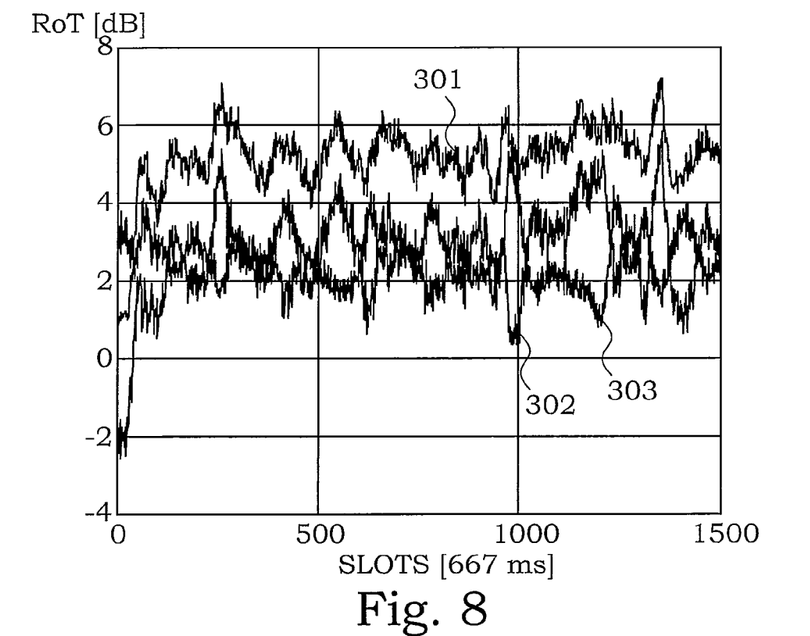
FIGS. 8 and 9 are diagrams illustrating simulation results based on the present invention.

In FIG. 8, RoT at the antenna 301, after GRAKE+ processing 302, as well as the difference between the two (the GRAKE+ IC gain) 303 are illustrated. Valid for user No. 0.

Figure 9:
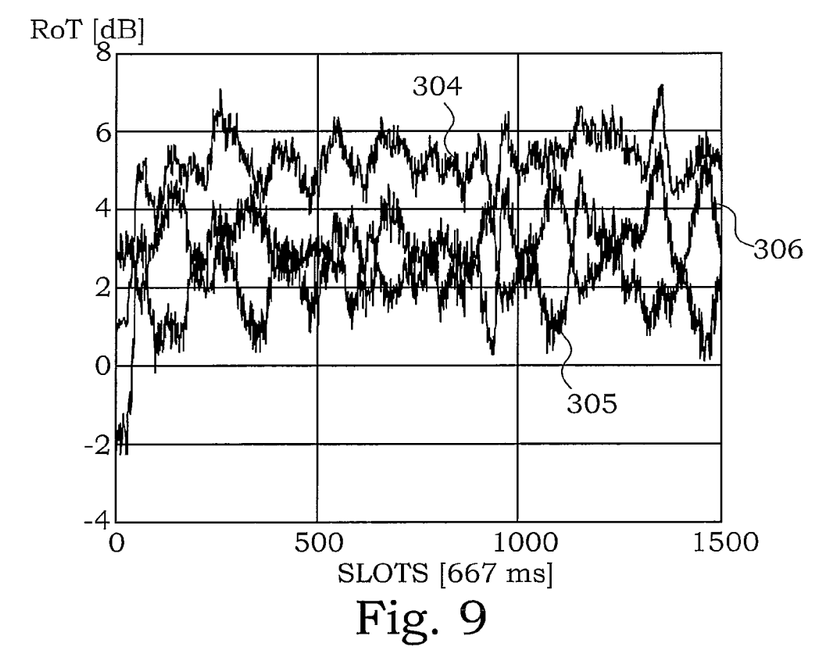

In FIG. 9, RoT at the antenna 304, after GRAKE+ processing 305, as well as the difference between the two (the GRAKE+ IC gain) 306 are illustrated. Valid for user No. 1.

It can be concluded that the disclosed methods work exactly as intended. The RoT after GRAKE+ processing is less than the RoT at the antenna, indicating a GRAKE+ IC gain of about 2 dB on average.

The invention thus discloses techniques that allow for load estimation that reflects the IC gains of GRAKE+, thus enhancing coverage and cell throughput at system level. Without the disclosed invention, large parts of the link gains associated with GRAKE+ would not materialize, due to the need to use too conservative margins. The applied back transformation reduces the computational complexity considerably, allowing a computation of the load only using inner products.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

Abbreviations

ASIC—Application Specific Integrated Circuits
C/I—Code power to Interference ratio
DSP—Digital Signal Processor
EUL—Enhanced UpLink
GRAKE—Generalized RAKE
IC—Interference Cancellation
RBS—Radio Base Station
RoT—Rise over Thermal
RSEPS—Received Scheduled Enhanced dedicated channel Power Share
RTWP—Received Total Wideband Power
SINR—Signal to Interference and Noise Ratio
SIR—Signal to Interference Ratio
UE—User Equipment
WCDMA—Wideband Code Division Multiple Access

The invention claimed is:

1. A method for noise rise estimation in a wireless communication system, said method comprising the steps of:
    measuring received total wideband power a plurality of times;
    computing an estimate of a noise floor measure based on at least a number of said measured received total wideband powers;
    performing an interference whitening based on one of GRAKE, GRAKE+ and chip equalizer for a first user;
    determining a useful signal power for said first user after interference whitening;
    deriving a first user noise floor compensation factor based on combining weights for said first user used in said interference whitening;
    obtaining a code power to interference ratio measure for said first user;
    calculating a noise rise measure for said first user, based at least on said useful signal power for said first user after interference whitening, said first user noise floor compensation factor, said code power to interference ratio measure for said first user and said noise floor measure;
    repeating the steps of performing, determining, deriving, obtaining and calculating for each of a plurality of users; and
    defining a system noise rise measure based on said noise rise measures for said plurality of users.

2. The method of claim 1, wherein said code power to interference ratio measure is selected from C/I and SINR.

3. The method of claim 1, wherein said first user noise floor compensation factor is derived as the product of a conjugate transpose of said combining weights and said combining weights as an approximation for white noise power floor.

4. The method of claim 1, wherein said first user noise floor compensation factor is derived as the trace of the product of a conjugate transpose of said combining weights, a thermal noise covariance matrix representing the correlation due to the spectral shape of the whole wideband channel and said combining weights divided by the trace of said thermal noise covariance matrix, for coloured noise power floor.

5. The method of claim 1, wherein said noise rise measure for said first user is calculated as said useful signal power for said first user after interference whitening divided by the product of said first user noise floor compensation factor and said noise floor measure and multiplied with a factor depending on the inverse of the code power to interference ratio measure for said first user.

6. The method of claim 1, wherein said system noise rise measure is defined as a maximum noise rise measure of said noise rise measures for said plurality of users.

7. The method of claim 1, wherein said system noise rise measure is defined as an average noise rise measure of said noise rise measures for said plurality of users.

8. The method of claim 1, wherein said system noise rise measure is defined as corresponding to a pre-selected percentile of said noise rise measures for said plurality of users.

9. An arrangement for noise rise estimation in a wireless communication system, the arrangement comprising:
    a digital receiver;
    an interference whitener connected to said digital receiver, said interference whitener being based on one of GRAKE, GRAKE+ and chip equalizer and said interference whitener being arranged for providing interference whitening for a plurality of users at an output;
    a processor connected to said digital receiver and to said output from said interference whitener, said processor being arranged to:
        measure received total wideband power received at said digital receiver a plurality of times;
        compute an estimate of a noise floor measure based on at least a number of said measured received total wideband powers;
        determine a useful signal power for a first user of said plurality of users after interference whitening;
        derive a first user noise floor compensation factor based on combining weights for said first user used in said interference whitening;

obtain a code power to interference ratio measure for said first user;

calculate a noise rise measure for said first user, based at least on said useful signal power for said first user after interference whitening, said first user noise floor compensation factor, said code power to interference ratio measure for said first user and said noise floor measure;

repeat said determining, deriving, obtaining, and calculating for each of said plurality of users; and define a system noise rise measure based on said noise measures for said plurality of users.

10. The arrangement of claim 9, wherein at least said processor is implemented by at least one of an application specific integrated circuit and a digital signal processor.

11. A base station of a wireless communication system, wherein said base station comprises an arrangement for noise rise estimation according to claim 9.

* * * * *